United States Patent
Delling et al.

(10) Patent No.: US 6,678,610 B2
(45) Date of Patent: Jan. 13, 2004

(54) METHOD FOR OBTAINING A MAP REPRESENTATION, AND A NAVIGATION DEVICE

(75) Inventors: Thomas Delling, Freudenberg (DE); Claus Fabig, Amberg (DE); Dieter Ritter, Fürth (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/373,344

(22) Filed: Feb. 24, 2003

(65) Prior Publication Data

US 2003/0154021 A1 Aug. 14, 2003

Related U.S. Application Data

(63) Continuation of application No. PCT/DE00/02907, filed on Aug. 24, 2000.

(51) Int. Cl.[7] .............................................. G01C 21/32
(52) U.S. Cl. ...................... 701/208; 701/209; 701/211; 701/212; 340/990; 340/995.1
(58) Field of Search ................................ 701/200, 208, 701/209, 210, 211, 212, 213; 340/988, 990, 995.1

(56) References Cited

U.S. PATENT DOCUMENTS

| | | | | |
|---|---|---|---|---|
| 5,067,081 A | * | 11/1991 | Person | 701/202 |
| 6,184,823 B1 | * | 2/2001 | Smith et al. | 342/357.13 |
| 6,308,177 B1 | * | 10/2001 | Israni et al. | 707/100 |
| 6,385,533 B1 | * | 5/2002 | Halt et al. | 701/207 |

FOREIGN PATENT DOCUMENTS

| | | | | |
|---|---|---|---|---|
| DE | 1984735 A1 | 5/1999 | | G09B/29/10 |
| EP | 0731338 A1 | 9/1996 | | G01C/21/20 |
| EP | 0802516 A2 | 10/1997 | | G08G/1/0969 |
| EP | 0803706 A2 | 10/1997 | | G01C/21/20 |
| EP | 1024467 A2 | 8/2000 | | G08G/1/0969 |

OTHER PUBLICATIONS

PCT International Search Report PCT/DE00/02907.

* cited by examiner

*Primary Examiner*—Gertrude Arthur
(74) *Attorney, Agent, or Firm*—Baker Botts L.L.P.

(57) ABSTRACT

A method and arrangement for obtaining a card representation from sections of roads which are digitized (20) from a first data base and digitized three-dimensional objects (30) from a second data base are disclosed, wherein the geographical coordinations of a section of road are compared to those of an object. If the section of road and the object overlap, a displacement occurs. A navigation device displays such a representation on a display.

20 Claims, 8 Drawing Sheets

METHOD FOR OBTAINING A MAP REPRESENTATION, AND A NAVIGATION DEVICE

CROSS REFERENCE TO RELATED APPLICATION

This application is a continuation of copending International Application No. PCT/DE00/02907 filed Aug. 24, 2000, which designates the United States.

BACKGROUND OF THE INVENTION

The invention relates to a method for obtaining a map representation from digitized road segments and digitized objects, at least one road segment and at least one three-dimensional object being loaded from a database. The invention also relates to a navigation device for obtaining and for displaying the map representation.

JP 62-93614 A discloses a navigation device in which images of a multiplicity of predetermined points are stored inside a database. The appropriate image is output if a driver approaches such a points.

For this purpose, the images, as a rule buildings, must be individually photographed, digitized and inserted into a database with road segments at the corresponding coordinates. The outlay for this is considerable.

SUMMARY OF THE INVENTION

It is an object of the invention to provide a method for obtaining a map representation and a navigation device suitable for outputting the map representation which can make use for the substantially positionally accurate representation of three-dimensional objects within a road map of data that has been obtained automatically by means of aerial photographs.

This object can be achieved by a method for obtaining a map representation from digitized road segments and digitized objects, comprising the steps of:

loading a road segment from a first database, loading a three-dimensional object from a second database, comparing the geographic coordinates of the road segment with the geographic coordinates of the object, if the road segment and the plan view of the object overlap one another in an overlap region, then displacing the road segment and the object so far relative to one another in a displacement direction, or reducing the base surface of the object so far, that the overlap region vanishes, and outputting the road segment and the object in a fashion displaced relative to one another.

The road segments and objects may originate from different databases. The geographic coordinates of the object can be obtained by means of aerial photographs. The geographic coordinates of the road segment and of the object can be transformed into a common coordinate system. A displacement of road segment and object can be omitted when an overlap region remains upon reduction of the area of the object by at least 30%. A displacement direction, in which the object is displaced relative to the road segment, can be determined perpendicular to a line of intersection that is formed by the intersection points of the road segment with edges of the plan view of the object. The road segment can be provided with boundary lines. A displacement direction of the object relative to the road segment can be determined perpendicular to a line of intersection that is formed by the intersection points between the plan view of the object and that boundary line which is closest to the centroid of the plan view of the object. The magnitude of the displacement can be formed by the distance in the displacement direction between the point of the plan view of the object that projects furthest over the boundary line, and the boundary line. A displacement can be undertaken in at least two displacement directions, and in that the magnitude of the displacement is reduced in every displacement direction to a value below 100%. The object can be centered between two neighboring road segments. The base surface of the object can be reduced when, after a displacement, the plan view of the object touches or overlaps another road segment or the plan view of another object. An overlap region can be caused to vanish by modifying the spatial arrangement of the object relative to the road segment by means of a relaxation method. The dimensions of mutually bordering edges can be respectively reduced iteratively with the aid of the same reduction factor until the overlap region vanishes. Displacements of the object and reductions can be undertaken repeatedly in an alternating fashion.

Furthermore, the object can be achieved by a navigation device comprising a display device and a processor that is connected to at least one storage medium, wherein the navigation device further comprises means for loading at least one road segment from a first database, for loading at least one object from a second database, for comparing the geographic coordinates of the road segment with the geographic coordinates of the object, for displacing the road segment and the object relative to one another or for reducing the base surface of the object, provided that an overlap region occurs between the road segment and the plan view of the object, and specifically to such an extent that the overlap region vanishes, and for the mutually displaced output of the road segment and the object on the display device.

The navigation device may further comprise an interface for transmitting a selected map representation from the navigation device to a portable data processing unit.

Since the map representation is obtained from two separate databases, it is possible for the purpose of representing three-dimensional objects such as buildings or prominent natural points in a road network to use data of objects that have been detected automatically with their coordinates by means of aerial photographs from aircraft or satellites and stored in a database. On the other hand, in order to represent the roads running in a map view it is possible to use already existing digital road maps that comprise a network of road segments with associated nodes. This digital road network can be used for calculating a route from a starting point to a target point selected by a user.

The three-dimensional objects are regularly stored by means of describing geometric shapes, for example as plane polygons, curved surfaces or so-called NURBS surfaces. In addition, it is also possible to store the surface for the corresponding object in the form of a texture in a further database.

Since the roads and the three-dimensional graphic objects are detected in different ways and with errors in each case, it is also possible for road segments and the plan views of the objects to overlap one another. In order to avoid a representation in which, for example, a building is placed in the middle of a road, road segment and object are, if appropriate, displaced relative to one another and/or the base surface of the object is reduced.

It is possible in this way to dispense with individual detection of a three-dimensional object, and with individually embedding it in a digital road map.

The three-dimensional scene modeling obtained according to the invention from the separate databases is suitable both for direct output onto a monitor of a navigation device or of a computer and for storage in a single database which can then be accessed by a terminal (navigation device or computer).

The magnitude by which an object must be displaced relative to a road segment is determined by the distance between a road segment or its boundary line and that point of the plan view of the object which projects furthest over the road segment or the boundary line.

If a plurality of lines of intersection are present between the plan view of an object and one or more road segments, a displacement direction is determined for each line of intersection. The displacement is then executed iteratively by means of a relaxation method, that is to say in each displacement direction the magnitude of the displacement is respectively cyclically fixed to be smaller than the distance there between the boundary line of a road segment and the point projecting furthest over the boundary line. After execution of a first displacement, or after execution of a first reduction of the base surface, a check is made in each displacement direction as to whether there is still a need for a further displacement step that is then, if appropriate, executed in the same way. A slow glide into an optimum is achieved by the relaxation. Displacement and scaling operations are executed in an alternating fashion in this way with the aid of a changing factor.

If the surface of the object is too large to be able to find space within neighboring road segments, a further relaxation method is applied by undertaking directional scaling (reduction) of the surface of the object. Said surface is reduced in a similar way in different directions, preferably while maintaining the proportions of the base surface, in several steps, if appropriate.

A map representation thus obtained with a realistic scene, which is distinguished by the representation of three-dimensional objects, can also be transmitted to a portable data processing unit. Such mobile data processing devices are known, for example, under the names of personal digital assistant, handheld PC or notebook. Individual scenes selected by a user can be transmitted to the mobile device via a wired interface or wireless interface such as Bluetooth. Such a scene permits a user to orientate him/herself on the spot. The transmission of the data can be performed from a home PC or, upon leaving a vehicle, from a navigation device.

BRIEF DESCRIPTION OF THE DRAWINGS

Further advantages, features and possible applications of the invention follow from the description of an exemplary embodiment in conjunction with the drawings, in which.

DETAILED DESCRIPTION OF THE PREFERRED EMBODIMENTS

Figure 1:
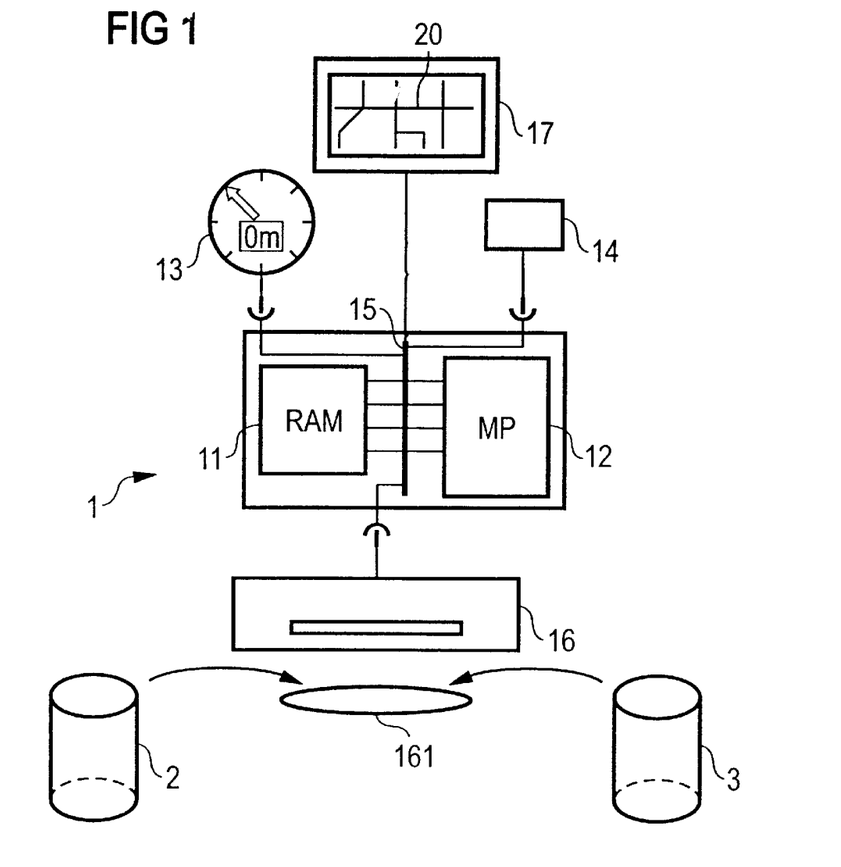
FIG. 1 shows a navigation device.

FIG. 1 shows a navigation device 1 having a main memory 11 that is assigned a microprocessor 12. Just like a direction meter 14 (gyroscope), a drive 16 for a storage medium 161 and a display device 17, a distance meter 13 (odometer) is connected to the microprocessor 12 via a system bus 15. In addition, the navigation device has a satellite receiver (not illustrated).

Two symbolically represented databases 2 and 3 are stored on the storage medium 161, which is a DVD (Digital Versatile Disk).

Stored in the first database 2 is a network of road segments and nodes that the microprocessor 12 accesses via the drive 16 in order to calculate an optimal route from a starting point to a target point. The road segments are fixed by the coordinates of the nodes, which define the segments. The road segments and nodes form a road network from two-dimensional geo-information system data of which a portion is illustrated on the display device 17.

The database 3 contains three-dimensional objects, in particular models of towns and buildings, that are present as vector graphics. The database also contains additional information about the objects, specifically the nature of their surfaces or texture, images of vegetation, street lamps and traffic lights.

Furthermore, the storage medium 161 can also contain databases with three-dimensional terrain models and additional information about points or objects of general interest (Points of Interest).

Figure 2:
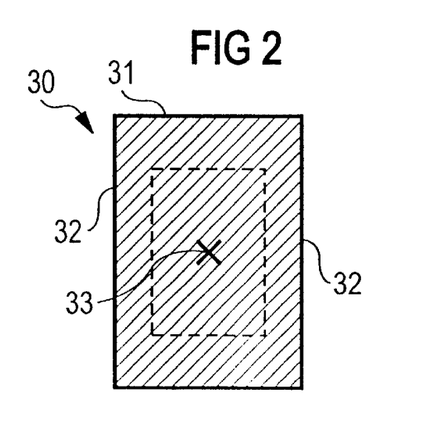
FIGS. 2 and 3 respectively show a plan view of an object.

A plan view of an object 30 is illustrated in FIG. 2. This is a building, more precisely a building or house with a rectangular plan view that is bounded by edges 31 and 32 of different length. The reference numeral 33 denotes the centroid of the plan view of the object.

Pointed lines show the plan view of the building with a surface reduced by 40%. In this case, all the edges 31 and 32 that delimit the building are reduced in proportion by the same factor.

Figure 3:
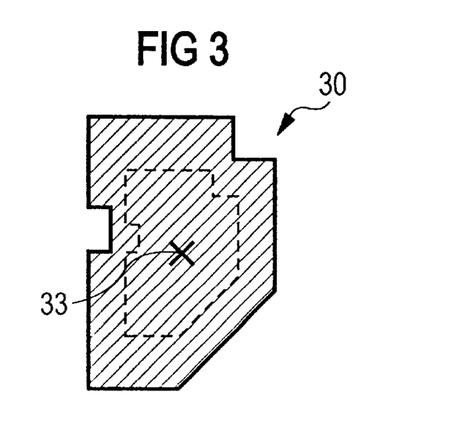

An object 30 with a more complicated structure is shown in the same way in FIG. 3.

Figure 4:
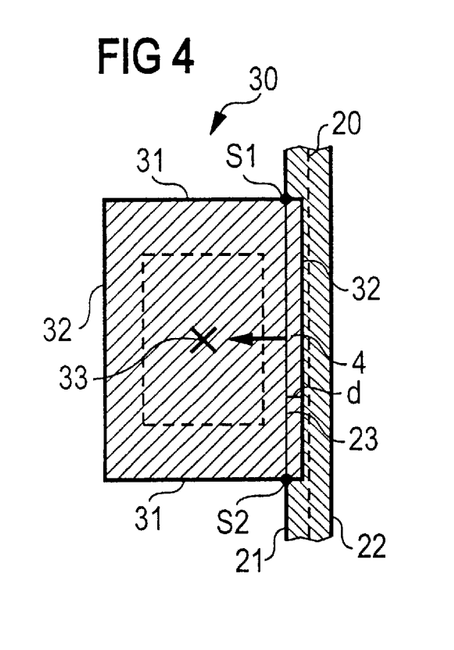
FIGS. 4–11 show the displacement of one object in each case.

FIG. 4 illustrates the plan view of an object 30 that projects into a road and forms an overlap region 4 with it.

Although the road of the associated database is present only as a sequence of one-dimensional segments 20, it is illustrated in two dimensions on the display device. The one-dimensional road segment 20 is reproduced as the center line of the road. Boundary lines 21 and 22 are additionally drawn on both sides of the center line. The width of the road, that is to say the distance to be reproduced between the boundary lines, is determined by its road class provided that no explicit additional information about the road is available, or provided that the boundary lines are not themselves stored in digitized form in the database.

Before a displacement of the object 30 relative to the road segment 20 or the boundary line 21 or 22 thereof, a check is made as to whether a displacement is permissible in the particular case. For example, an object such as a bridge that leads over a road is specifically not permitted to be displaced from a road. There is a corresponding situation when a road runs under an object in a tunnel.

A suitable criterion for ascertaining the permissibility of a displacement is the reduction of the base surface of the object by at least 30% to 60%. The proportions of the edges 31, 32 of the object that enclose the plan view are to be retained in this case. The dashed line in the interior of the object 30 shows a surface reduced to 60% of the original surface.

The reduction in the plan view did not change the location of the centroid 33. A displacement is permissible since the reduced base surface no longer overlaps the road.

The direction r, in which the object 30 is to be displaced relative to the road segment 23 or the boundary lines 21 and 22 thereof, is perpendicular to a line 23 of intersection that is formed by two intersection points S1 and S2 between the road segment 20 or one of the boundary lines 21 and 22 and two edges 31, 32 of the object. In the case of a two-dimensional representation of the road, in the case of which the road, as illustrated, is not depicted only as a line but with a naturalistic roadway, one of the boundary lines 21, 22 is regularly used as a starting point for determining the direction r and a magnitude d for the displacement. It is preferable to use that road contour or boundary line 31 which lies on the side facing the centroid 33 of the object 30.

The magnitude d or the distance by which a displacement must take place in order to permit the overlap region to vanish completely results from the distance between the segment 20, and here, more precisely, the boundary line 21, 22 that faces the object 30 and that point of the object 30 which projects furthest over the segment 20, and more precisely over the boundary line 21, 22.

Figure 5:
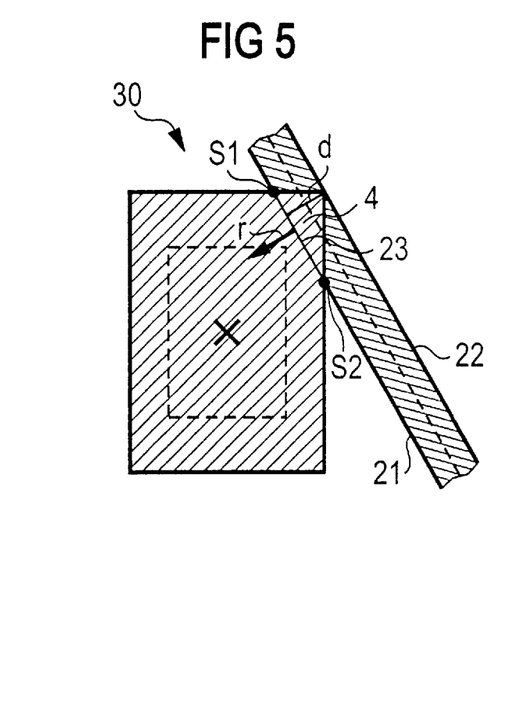

A plan view of a building of which one corner projects into a road is shown in FIG. 5. The lateral displacement is determined in the same way as in the case of FIG. 4.

Figure 6:
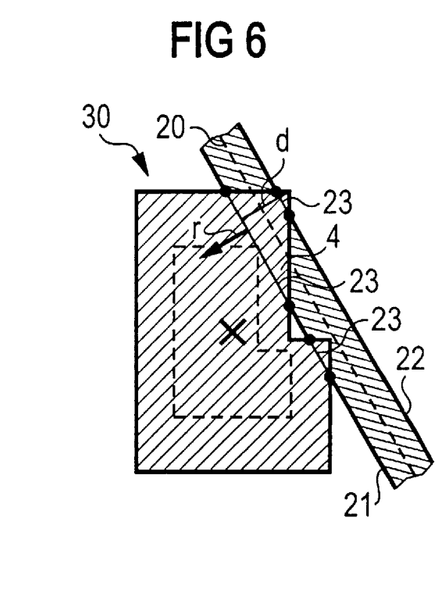

Resulting in FIG. 6 are six intersection points, and thus three lines 23 of intersection between the illustrated object 30 and the boundary lines 21, 22 of the illustrated road. However, the same displacement direction r results for all lines 23 of intersection. The magnitude d by which the object must be displaced relative to the road is determined, in turn, by the distance between the boundary line 21 facing the object 30 and the point of the object that projects furthest over this boundary line in the direction of the road and beyond the latter.

Figure 7:
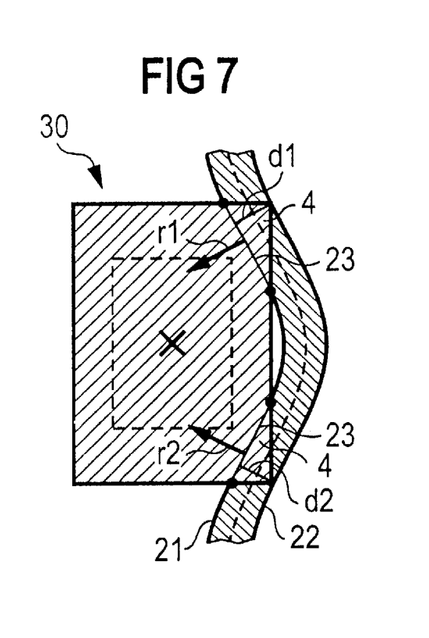

As regards FIG. 7, the road boundary line 21 illustrated, which faces the object 30, cuts the object 30 into two different zones such that two overlap regions 4 are produced. For the overlap regions, this results both in different displacement directions r1 and r2 and in different magnitudes d1 and d2 for the lateral displacement.

Figure 8:
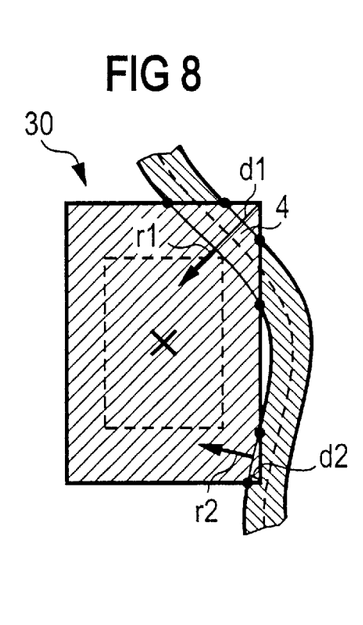

The same holds for FIG. 8. However, in one of the two overlap regions the object is cut by the two roadway boundary lines of the road.

Figure 9:
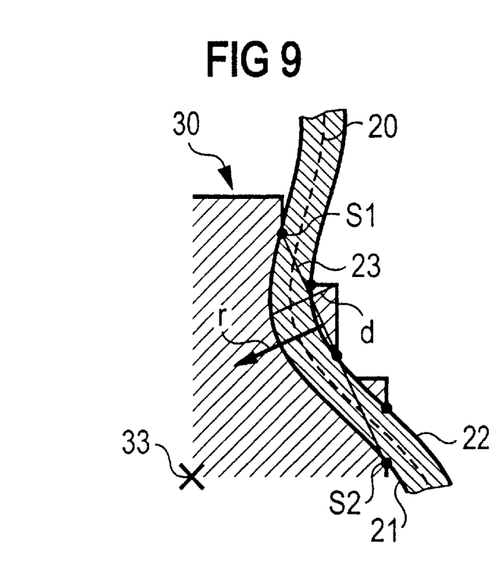

In FIG. 9, the boundary lines 21 of the road segment 20 that face the centroid 33 of the object 30 cuts the object at two intersection points S1 and S2. The boundary line 22 diverted from the centroid of the object cuts the contour or the plan view of the object several times. Only the line 23 of intersection between the intersection points S1 and S2 between the boundary line 21 and the contour or the edges of the object is used to form the displacement direction r.

Figure 10:
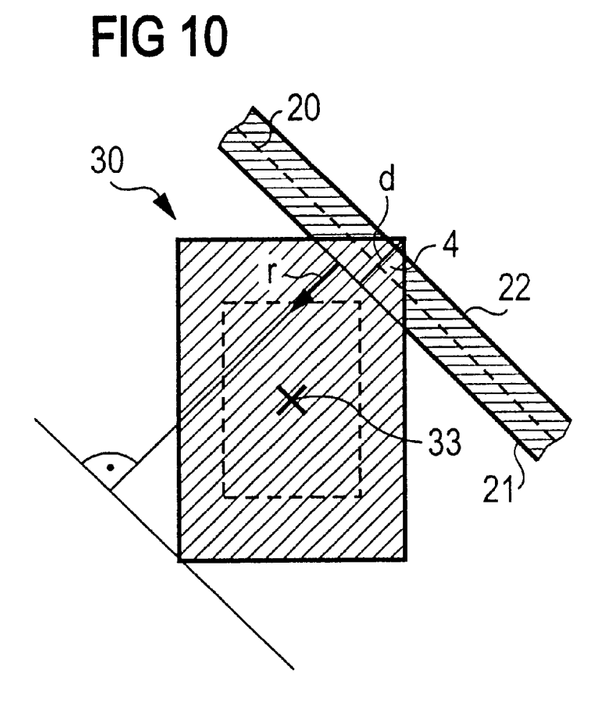

In FIG. 10, the object 30 is cut once again by the boundary line 21 facing the centroid 33, and by the second boundary line 22. No special features arise here, since the lines of intersection run parallel to one another and only one displacement direction r therefore comes into consideration.

Figure 11:
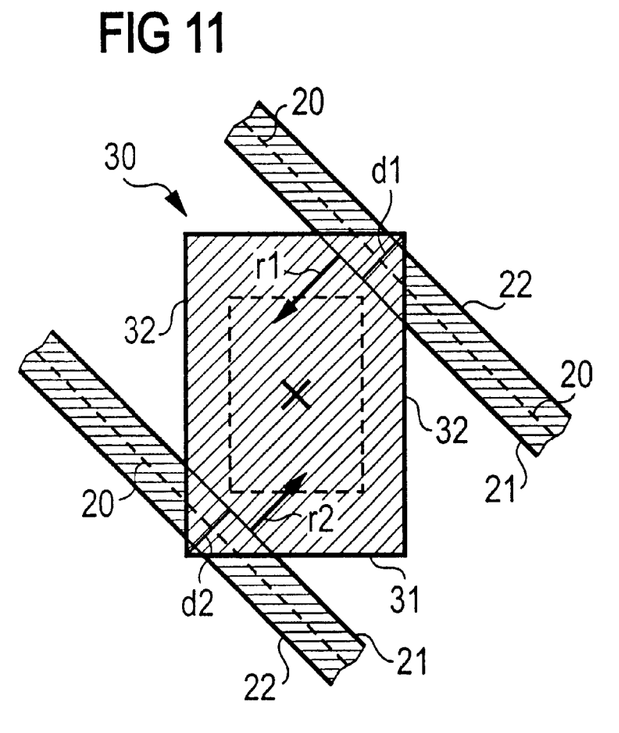

The object illustrated in FIG. 11 is cut by two neighboring road running in parallel. The displacement direction r1 and r2 run in opposite directions relative to one another. The magnitudes of the displacements d1 and d2 are approximately equal.

In this case the lateral correction of the object 30 must be performed by scaling in the directions r1 and r2. The magnitudes d1 and d2 with which the edges 31 and 32 of the object must be displaced for the purpose of reduction are determined as described above. During the surface reduction, the ratios of the edges 31 and 32 or the side ratios remain constant.

Figure 12:
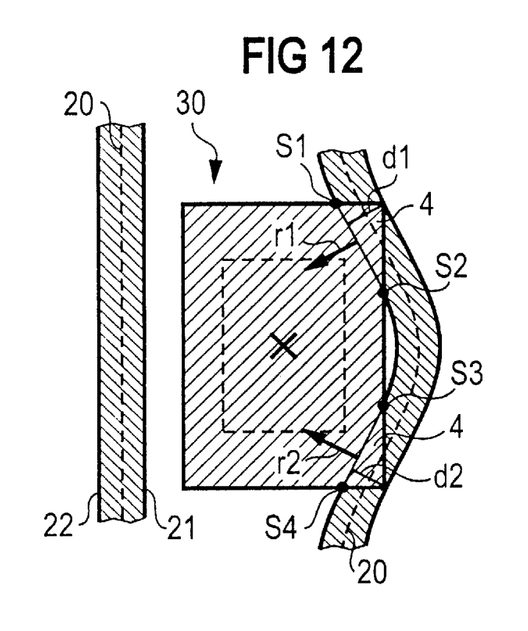
FIGS. 12–14 show the displacement and reduction of an object.

Object 30 is arranged between two roads in FIG. 12. The object 30 is cut twice by the boundary lines of one of the two roads such that two overlap regions 4 result. It is possible for this to determine two different directions r1 and r2 and the magnitudes d1 and d2, belonging to the respective directions, for the distance of the displacement.

Figure 13:
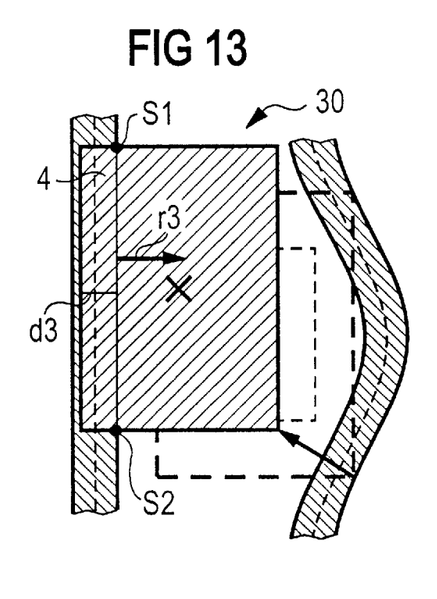

FIG. 13 shows the object 30 after its displacement by the magnitudes d1 and d2 in the directions r1 and r2. Because of the displacement carried out, the object 30 now partially covers the neighboring road. In the way previously described, it is possible to calculate a new displacement direction r3 and a corresponding magnitude d3 for the requisite distance of the displacement.

However, the lateral displacement of the object 30 is not performed below by a displacement, but by a scaling of the object, since it does not fit between the roads in this relative position.

Figure 14:
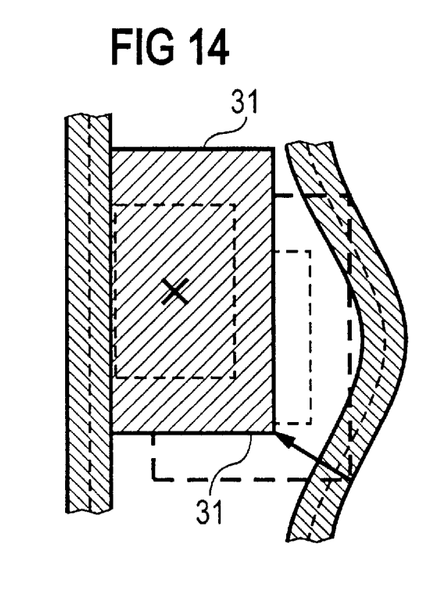

FIG. 14 shows the result of the scaling. The opposite edges 31 of the object were shortened by the magnitude d3. The object 30 therefore now fits between the two roads.

Figure 15:
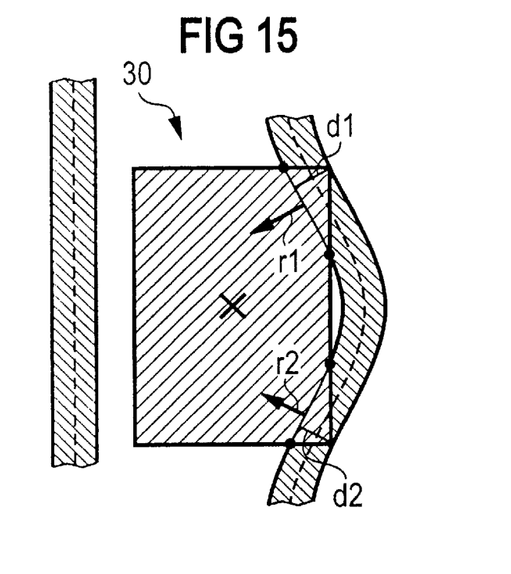
FIGS. 15–17 show the displacement of an object by means of a multistage relaxation method.

FIG. 15 illustrates the same initial scene as FIG. 12. However, a relaxation method is used for correction below.

Figure 16:
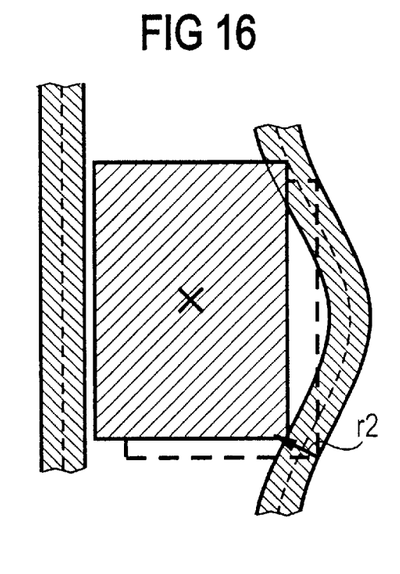

A displacement in the direction r2 is illustrated in FIG. 16. However, the magnitude associated therewith for the displacement d2 was multiplied by a factor f<1. 0.6 was selected as the factor f, and so a displacement by only 60% of the magnitude defined by D2 was performed in the direction r2.

Figure 17:
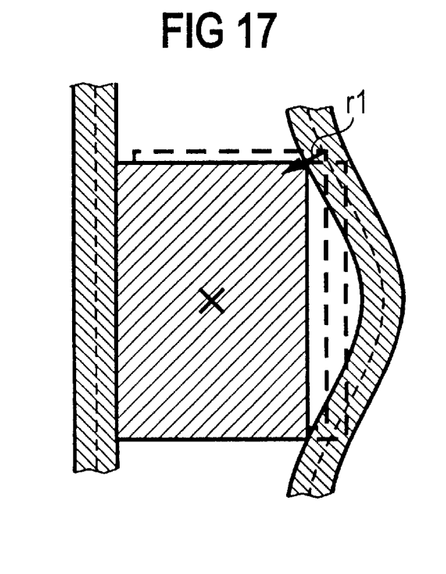

A further displacement of the object was undertaken in FIG. 17, specifically in the direction r1. Once again, the displacement was not performed with the full magnitude d1 that defines the distance between the boundary line, facing the centroid, of the road and the point of the object that projects furthest over the boundary line therefrom in a direction perpendicular to the line of intersection. Rather, the magnitude d1 was likewise reduced by 40%. It is to be seen as a consequence of this relaxation that it was possible for the object to be displaced between the neighboring roads or the consecutive road segments of the road running in a curved fashion such that the object fits therebetween without reducing the plan view.

Had this not been the case, there would additionally have been a need further to reduce the plan view. This would likewise have been undertaken iteratively in the previously described way with the aid of a reduced magnitude while retaining the proportions of the plan view. In general, all corrections are undertaken cyclically with the aid of a changeable factor f until an overlap region no longer exists.

Figure 18:
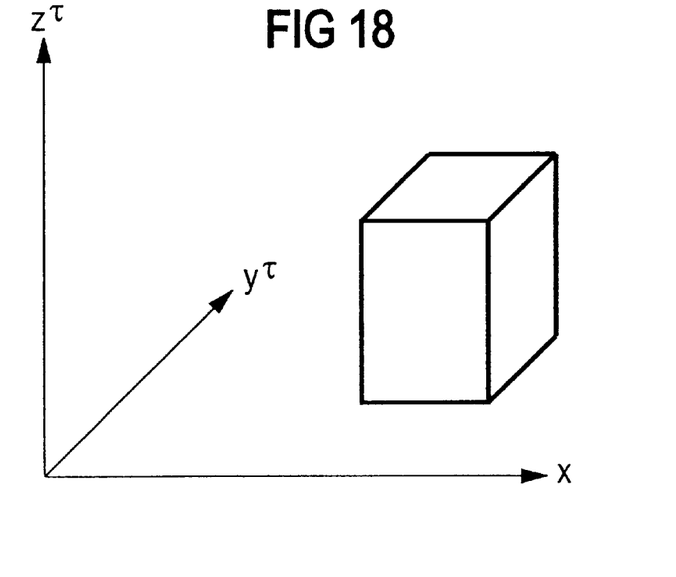
FIGS. 18–19 show the transformation of the three-dimensional geo-information data of the objects into a common coordinate system with the road segments.

FIG. 18 shows a three-dimensional object that was recorded with the aid of an aerial photograph and converted into a vector graphic. The vector graphic is a cubic shape in this case. The object is determined by its three-dimensional coordinates in the x-, y- and z-directions. All the corner points of the plan view of the object are assigned a two-dimensional coordinate x- and y-directions.

An object is stored in terms of data as a field with the corner points of its plan view and the data for its height in Gauss-Krüger coordinates.

Figure 19:
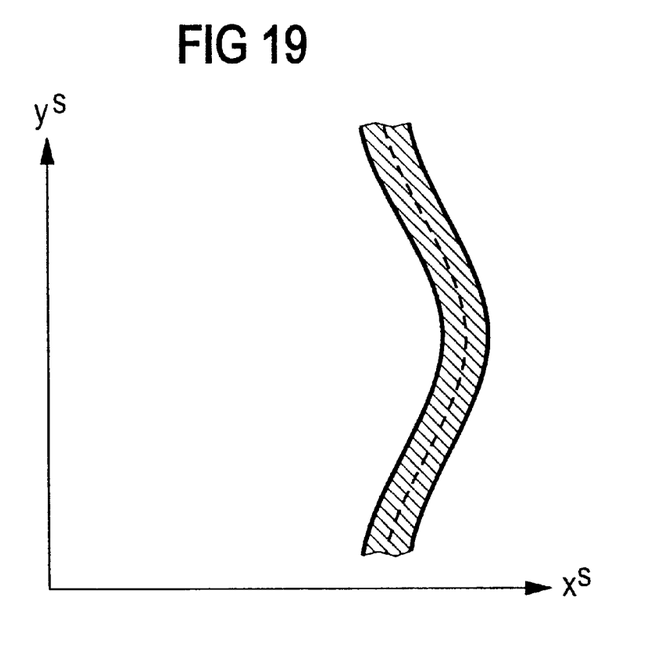

FIG. 19 illustrates a road that is provided with boundary lines and comprises two neighboring consecutive road segments. The angle at which the road segments abut one another was distorted or rounded off by means of a nonlinear interpolation such that the consecutive road segments form not an edge but a bow. Furthermore, the road segments were provided with boundary lines.

The position of the road segments is defined by consecutive nodes. The position of the nodes is specified starting from 0 meridian through Greenwich and the equator in degrees of latitude and in degrees of longitude.

The data for the three-dimensional objects to be represented and for the road segments must be fused and be transferred into a common coordinate system for the purpose of outputting on the display device.

Because of the limited measuring accuracy in the detection of the objects and of the road segments, and because of the inaccuracies in the conversion into a common coordinate system, overlaps are produced between roads and objects. These are removed in the way described above.

A Gauss-Krüger coordinate system is used as common coordinate system for the road segments and the three-dimensional objects. Polygonal three-dimensional descriptive data with the plan views of the objects, their height data and additional information (for example roof framework geometries and texture) are obtained for this purpose from the three-dimensional geo-information system data.

A common, location-dependent, perspective projection onto the display device is performed using the two-dimensional geo-information system data of the road segments ($x^s$, $y^s$; $z^s$=0) and the three-dimensional geo-information system data ($x^r$, $y^r$, $z^r$) with the aid of the projection parameters of rotation ($\alpha_t$, $\beta_t$, $\gamma_t$) and displacement ($x_t$, $y_t$, $z_t$). The projection is undertaken, furthermore, with a specific focal length F. This corresponds to a viewing angle or aperture angle at which a viewer is offered a map view or representation of a scene. The coordinates $\tilde{x}, \tilde{y}$ used on the display device are determined as follows for every point i=($x_i$, $y_i$, $z_i$) of the two coordinate systems ($x^s$, $y^s$, $z^s$) and ($x^r$, $y^r$, $z^r$) for reproduction in a defined direction of view:

$$\begin{pmatrix} x'_i \\ y'_i \\ z'_i \end{pmatrix} = \alpha_i \beta_i \gamma_i \begin{pmatrix} x_i \\ y_i \\ z_i \end{pmatrix} + \begin{pmatrix} x_t \\ y_t \\ z_t \end{pmatrix};$$

$$\tilde{x}_i = F * \frac{x'_i}{z'_i};$$

$$\tilde{y}_i = F * \frac{y'_i}{z'_i}$$

Figure 20:
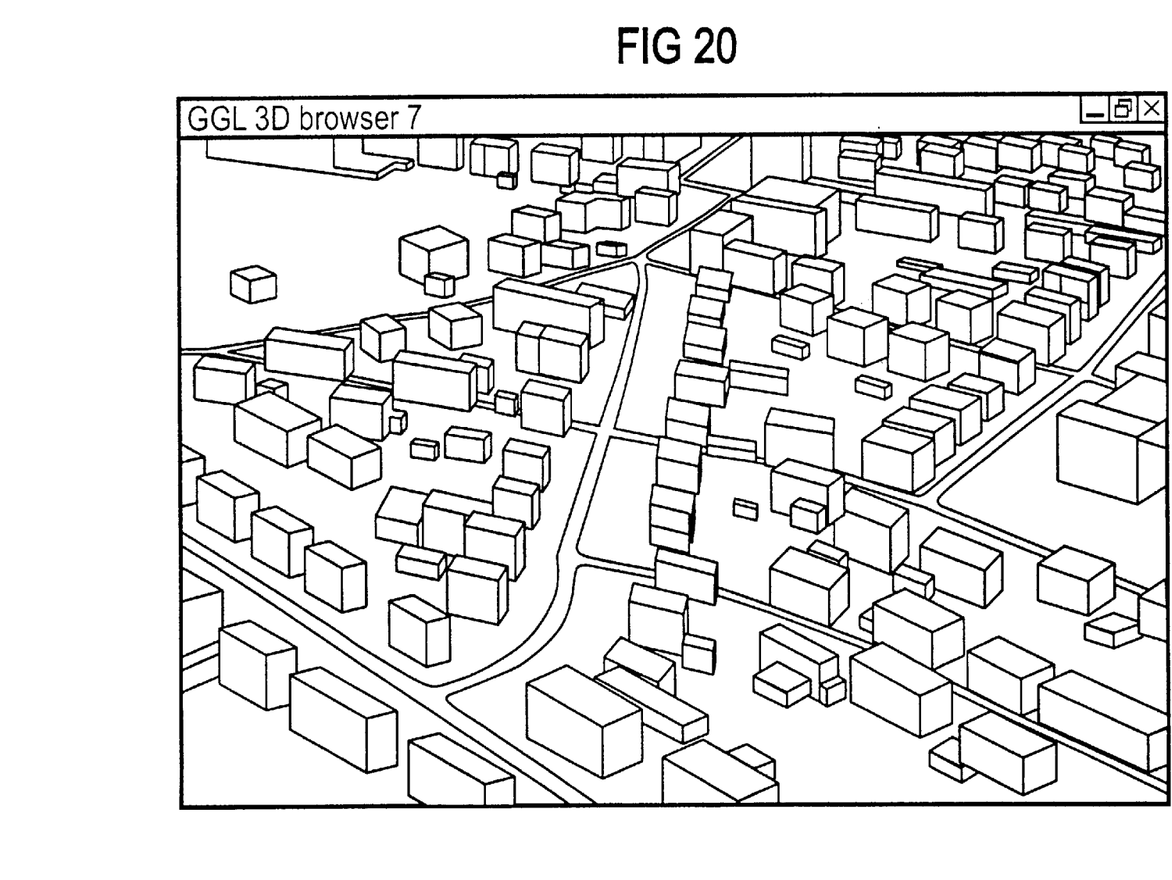
FIG. 20 shows a map representation that reproduces road segments with three-dimensional objects.

FIG. 20 shows a map representation that was obtained from digitized road segments of the first database and three-dimensional objects of the second database. The three-dimensional objects (buildings) were displaced in the way described above relative to the road segments and, if appropriate, reduced.

What is claimed is:

1. A method for obtaining a map representation from digitized road segments and digitized objects, at least one road segment and at least one three-dimensional object being loaded from a database, wherein the road segments and objects originate from different databases, and the map representation is obtained by means of the following steps:

loading the road segment from a first database, loading the three-dimensional object from a second database, comparing the geographic coordinates of the road segment with the geographic coordinates of the object, if the road segment and the plan view of the object overlap one another in an overlap region, then displacing the road segment and the object so far relative to one another in a displacement direction, or reducing the base surface of the object so far, that the overlap region vanishes, and outputting the road segment and the object in a fashion displaced relative to one another.

2. The method as claimed in claim 1, wherein the geographic coordinates of the object are obtained by means of aerial photographs.

3. The method as claimed in claim 1, wherein the geographic coordinates of the road segment and of the object are transformed into a common coordinate system.

4. The method as claimed in claim 1, wherein a displacement of road segment and object is omitted when an overlap region remains upon reduction of the area of the object by at least 30%.

5. The method as claimed in claim 1, wherein a displacement direction, in which the object is displaced relative to the road segment, is determined perpendicular to a line of intersection that is formed by the intersection points of the road segment with edges of the plan view of the object.

6. The method as claimed in claim 1, wherein the road segment is provided with boundary lines.

7. The method as claimed in claim 1, wherein a displacement direction of the object relative to the road segment is determined perpendicular to a line of intersection that is formed by the intersection points between the plan view of the object and that boundary line which is closest to the centroid of the plan view of the object.

8. The method as claimed in claim 1, wherein the magnitude of the displacement is formed by the distance in the displacement direction between the point of the plan view of the object that projects furthest over the boundary line, and the boundary line.

9. The method as claimed in claim 1, wherein a displacement is undertaken in at least two displacement directions, and in that the magnitude of the displacement is reduced in every displacement direction to a value below 100%.

10. The method as claimed in claim 1, wherein the object is centered between two neighboring road segments.

11. The method as claimed in claim 1, wherein the base surface of the object is reduced when, after a displacement, the plan view of the object touches or overlaps another road segment or the plan view of another object.

12. The method as claimed in claim 1, wherein an overlap region is caused to vanish by modifying the spatial arrangement of the object relative to the road segment by means of a relaxation method.

13. The method as claimed in claim 1, wherein the dimensions of mutually bordering edges are respectively reduced iteratively with the aid of the same reduction factor until the overlap region vanishes.

14. The method as claimed in claim 1, wherein displacements of the object and reductions are undertaken repeatedly in an alternating fashion.

15. A navigation device comprising a display device and a processor that is connected to at least one storage medium, wherein the navigation device further comprises means for loading at least one road segment from a first database, for loading at least one object from a second database, for comparing the geographic coordinates of the road segment with the geographic coordinates of the object, for displacing the road segment and the object, relative to one another or for reducing the base surface of the object, provided that an overlap region occurs between the road segment and the plan view of the object, and specifically to such an extent that the overlap region vanishes, and for the mutually displaced output of the road segment and the object on the display device.

16. The navigation device in claim 15, further comprising an interface for transmitting a selected map representation from the navigation device to a portable data processing unit.

17. A method for obtaining a map representation from digitized road segments and digitized objects, comprising the steps of:

loading a road segment from a first database, loading a three-dimensional object from a second database, comparing the geographic coordinates of the road segment with the geographic coordinates of the object, if the road segment and the plan view of the object overlap one another in an overlap region, then displacing the road segment and the object so far relative to one another in a displacement direction, or reducing the base surface of the object so far, that the overlap region vanishes, and outputting the road segment and the object in a fashion displaced relative to one another.

18. The method as in claim 17, wherein the road segments and objects originate from different databases.

19. The method as claimed in claim 17, wherein a displacement direction, in which the object is displaced relative to the road segment, is determined perpendicular to a line of intersection that is formed by the intersection points of the road segment with edges of the plan view of the object.

20. The method as claimed in claim 17, wherein a displacement direction of the object relative to the road segment is determined perpendicular to a line of intersection that is formed by the intersection points between the plan view of the object and that boundary line which is closest to the centroid of the plan view of the object.

* * * * *